United States Patent [19]

Conti

[11] Patent Number: 4,847,601

[45] Date of Patent: Jul. 11, 1989

[54] REMOTE TRANSMITTER KIT

[76] Inventor: William S. Conti, 184 Middle Hiway, Barrington, R.I. 02806

[21] Appl. No.: 177,655

[22] Filed: Apr. 5, 1988

[51] Int. Cl.[4] .......................... H04Q 9/14; G08C 19/00

[52] U.S. Cl. .................................. 341/176; 340/825.69

[58] Field of Search .............. 340/696, 825.69, 825.72; 455/99, 66

[56] References Cited

U.S. PATENT DOCUMENTS

| | | | |
|---|---|---|---|
| 2,588,879 | 3/1952 | Richards | 340/825.72 X |
| 3,936,833 | 2/1976 | Bush | 340/696 |
| 4,241,870 | 12/1980 | Marcus | 340/696 X |
| 4,247,850 | 1/1981 | Marcus | 340/696 X |
| 4,549,178 | 10/1985 | Lester | 340/825.58 |
| 4,731,605 | 3/1988 | Nixon | 340/696 |

FOREIGN PATENT DOCUMENTS

| | | | |
|---|---|---|---|
| 344278 | 3/1931 | United Kingdom | 340/696 |

OTHER PUBLICATIONS

Dash-Mount Remote Control Transmitter, J. C. Whitney Catalog, Jul. 1988.

*Primary Examiner*—Glen R. Swann, III
*Assistant Examiner*—Thomas J. Mullen, Jr.
*Attorney, Agent, or Firm*—Barlow & Barlow

[57] ABSTRACT

A remote transmitter conversion kit for converting garage door openers and the like, utilizes a voltage regulator which reduces the vehicle's power source to the operating voltage of the remote control transmitter device. The transmitter device is designed to be placed under the dash of the vehicle out of view with a remote switch installed to operate the transmitter.

1 Claim, 1 Drawing Sheet

REMOTE TRANSMITTER KIT

BACKGROUND OF THE INVENTION

The invention relates to battery powered radio transmitters, in particular, garage door opening devices but includes electronic gates, door locks, lights and the like.

Battery powered radio transmitters are normally kept on the dashboard, sun visors or in the shift console of a vehicle, thus exposing them to hazards such as theft, unwanted activation if the unit falls from its resting place or a youngster could activate the device when it is not suitable to so do and finally, the sun's rays could damage the transmitter over a period of time. In addition, the unit is one which requires batteries that have to be replaced periodically.

Prior art devices of this type are seen, for example, in Marcus, U.S. Pat. No. 4,241,870 and U.S. Pat. No. 4,247,850, as well as Bush, U.S. Pat. No. 3,936,833. The Marcus devices, for example, disclose transmitters which are positioned in a passenger compartment of a vehicle and there is a special power supply from the automobile electrical system for the transmitter which, when removed, relies on battery power. In the '850 patent, the transmitter is designed to be incorporated into a sun visor and powered from the main electrical source in the automobile.

SUMMARY OF THE INVENTION

The transmitter conversion kit allows the use of the unit as supplied from any manufacturer to be located anywhere within the vehicle that is convenient. The unit is operable over a wide temperature range from −30° C. to +75° C. and essentially replaces the battery with an electronic circuit in the form of a voltage regulator unit which reduces the voltage from the vehicle's power source, which is normally between 12–14 volts, to 9 volts. A conversion kit includes a connection between a fuse box in the automobile and the conversion unit and included is a normally open switch in a serial connection between the vehicle's power supply and the voltage regulator so that the transmitter may be activated by pressing the switch which selectively transmits a radio frequency signal to a selected location.

DESCRIPTION OF THE PREFERRED EMBODIMENTS

Figure 1:
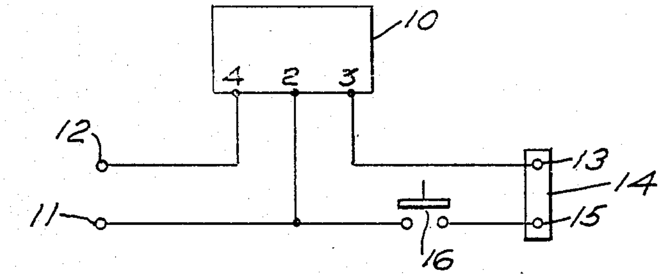
FIG. 1 is a circuit diagram of one form of the invention.

Referring to FIG. 1, an IC chip 10 is a three terminal device which may be an RCA SK-3962 or ECG 1902. The integrated circuit 10 is then connected from terminal 2 to ground terminal 11, whereas the positive supply 12 of the vehicle is connected to terminal 4 of the integrated circuit. Terminal 3 of the integrated circuit is then connected to the positive terminal 13 of a 9 volt style battery clip 14 while the negative terminal 15 is connected to a normally opened switch generally indicated 16, the other terminal of which is in turn connected with the terminal 2 of the integrated circuit. In operation, it is useful to have the ground wire at terminal 11 fitted with a ring connector while an automotive female spade connector can be usefully used connected to the positive terminal 12 for ease in connection to the fuse box of a vehicle. In turn, the connection to the switch 16, which may very well have spade connectors extending therefrom, can be easily made by fitting the wires with female automotive type connectors for the spade connectors.

Ideally, when all of the connections are made with suitable leads having been achieved, the circuit is tested and then placed in a mold and a fibreglass resin or the like is mixed and poured into the mold encapsulating the chip in a size frame where it will fit in the space occupied by a standard 9 volt battery.

In use, the installation of the unit is very simple in as much as it is only necessary to remove the screws holding the two halves of the tranmitter together, disconnect the battery and connect the battery clip and transmitter to the kit's clip 14 and place the chip, which is now encapsulated, into the area where the 9 volt battery was located. Then, one has to insert a foam or a sponge on top of the switch in the transmitting case, which would normally make contact to energize the RF tranmitter, so that when the transmitter is put back together again, the switch will make a permanent "on" contact. Then the transmitter unit can be fastened back together again and tested. The transmitter is then in a position where it can be placed under the dash or in some other location and secured with a plastic tie and the wires are appropriately routed to make the proper connections ot the fuse box. A location is then established for the switch and an appropriate size hole drilled, if necessary. While the integrated circuit is preferably placed within the transmitter, it need not be so placed and other locations can be chosen as long as a modification is made to the transmitter unit so that the switch in the transmitter is permanently in a connected position.

Figure 2:
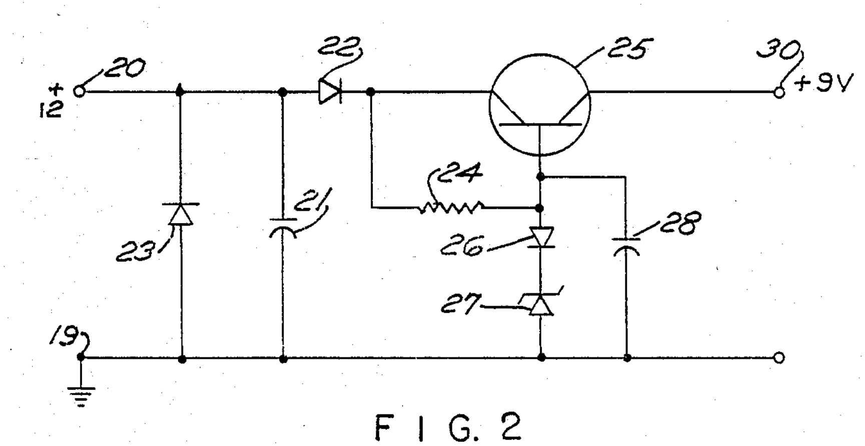
FIG. 2 is a circuit diagram of another form of the invention.

Referring to FIG. 2, another form of voltage regulator which is made of discrete components, is illustrated and in this case, a very small printed circuit board may be utilized. With reference to the circuit, the terminal 20 is connected to a positive source of voltage while the terminal 19 is connected to ground or negative. Across these terminals is a diode 23 and a capacitor 21. An NPN device 25 is provided, which device can be an RCA SK-3024 and its collector is connected via a diode 22 to the positive source of voltage and via a resistor 24 to the base of the device. The base of the device also is connected to ground via a serial circuit of a diode 26 and a zener diode 27, the serial connection being paralleled by a capacitor 28. The emitter of the device is connected to a positive output terminal 30. In essence, this device, which utilizes a 9 volt zener will maintain substantially a 9 volt output with a varying voltage input. The components used are as follows:

capacitor 21-0.047 mfd;
diodes 22, 23 and 26, 1N 4004;
resistor 24—470 ohm.;
zener 27, 1N 4739;
capacitor 28, 0.1 microfarad.

Figure 3:
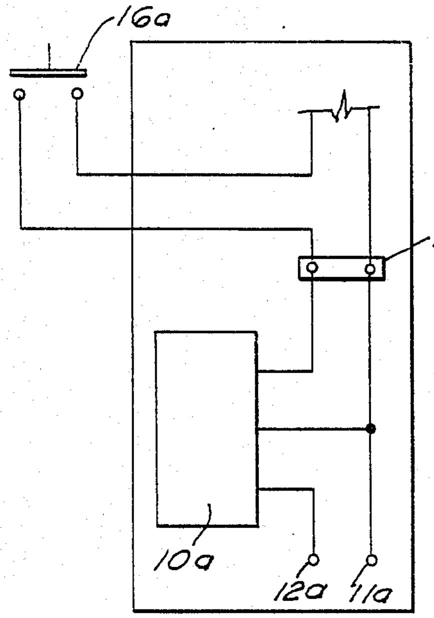
FIG. 3 illustrates a method of connecting a switch to the RF transmitter separately from the voltage regulator.

Referring to FIG. 3, some variations in connections are illustrated and are intended to be utilized in connection with the disclosure of FIG. 1 in particular. Here, the switch 16*a* is connected directly via leads 40 and 41 to the switch contacts of the existing transmitter so that when the arrangement is put together, the circuitry varies from that shown in FIG. 1 by the omission of the switch 16 so that the circuits shown in FIG. 3 attain with the integrated circuit 10*a* and the battery connector 14*a* connected as illustrated to the positive and negative terminals of the fuse block 12*a* and 11*a* respectively.

I claim:

1. A radio frequency transmission system adapted to be mounted in a vehicle having a passenger compartment, a dashboard located inside said passenger compartment, a fuse box located in said vehicle and accessible for wiring from inside said passenger compartment, and an electrical power supply electrically connected to said fuse box, comprising:

a voltage regulator unit comprising an electronic circuit adapted to be mounted beneath said dashboard inside said passenger compartment and electrically connected to said fuse box;

a transmitter unit adapted to be mounted adjacent said voltage regulator unit beneath said dashboard and inside said passenger compartment and electrically connected to said voltage regulator unit, whereby said transmitter unit is powered by said power supply regulated to 9 volts; and a switch means adapted to be mounted on said dashboard at a location remote from said transmitter unit for selectively electrically connecting said transmitter unit to said power supply to selectively transmit a radio frequency signal to a selected remote location.

* * * * *

UNITED STATES PATENT AND TRADEMARK OFFICE
CERTIFICATE OF CORRECTION

PATENT NO. : 4,847,601

DATED : July 11, 1989

INVENTOR(S) : William S. Conti

It is certified that error appears in the above-identified patent and that said Letters Patent is hereby corrected as shown below:

On the title page, item [76]:

Correct Inventor's Address to read:

17 Joy Street
Barrington, RI 02806

Signed and Sealed this

Twenty-first Day of August, 1990

*Attest:*

HARRY F. MANBECK, JR.

*Attesting Officer* *Commissioner of Patents and Trademarks*